United States Patent [19]

Lobley et al.

[11] Patent Number: 4,929,434

[45] Date of Patent: May 29, 1990

[54] CATALYTIC GENERATION OF CHLORINE DIOXIDE

[76] Inventors: Derek G. Lobley, 18775 54th Avenue, Surrey, British Columbia; Kenneth Pinder, 4195 Doncaster Way, Vancouver, British Columbia V6S 1W1, both of Canada

[21] Appl. No.: 321,009

[22] Filed: Mar. 9, 1989

[51] Int. Cl.$^5$ .............................................. C01B 11/02
[52] U.S. Cl. ................................................... 423/479
[58] Field of Search ........................................ 423/479

[56] References Cited

FOREIGN PATENT DOCUMENTS 2569677 3/1986 France ................................. 423/479

OTHER PUBLICATIONS

Mellor, J. W. "Comprehensive Treatise on Inorganic and Theoretical Chemistry", Part I, Supplement II, Longmans, Green and Co. New York, 1956.
Masschelein, W. J. "Chlorine Dioxide", Ann Arbor Science, Ann Arbor, Mi, 1979.

Primary Examiner—Jeffrey E. Russel
Assistant Examiner—Brian M. Bolam
Attorney, Agent, or Firm—Townsend and Townsend

[57] ABSTRACT

A process for producing chlorine dioxide by reducing a chlorate in sulphuric acid of at least 4N with a reducing agent. An oxygen containing organic compound is introduced into the process.

4 Claims, 4 Drawing Sheets

CATALYTIC GENERATION OF CHLORINE DIOXIDE

FIELD OF THE INVENTION

This invention relates to a process for producing chlorine dioxide gas.

DESCRIPTION OF THE PRIOR ART

Chlorine dioxide is used in pulp and paper mills to bleach paper. It is used in aqueous solution at concentrations of between 5 and 10 grams per liter.

The principal systems for production of the gas are the Mathieson, Solvay, R-2, R-3, and R-8 Processes.

All these processes reduce a chlorate, usually sodium chlorate, in a strong sulphuric acid medium. Generally speaking, the main difference between the processes is in the reducing agent used. In the Mathieson Process, the reducing agent is sulphur dioxide, in the Solvay and R-8 Processes, the reducing agent is methanol. In the R-2 and R-3 Processes, the reducing agent is mainly sodium chloride.

Copending U.S. Ser. No. 092,028, filed Sept. 1, 1987 discloses the use of sulphur as a reducing agent in the production of chlorine dioxide. Sulphur is used in the form of an aqueous sulphur solution containing stabilizers and dispersants. Fine sulphur particles seem to provide sufficient surface to accelerate the reduction of sodium chlorate beyond what was previously thought possible.

An essential part of all these processes is the reaction to produce chloric acid which, in turn, is reduced by the reducing agent to produce chlorine dioxide gas. The quantity of chlorine dioxide produced per unit time is a function of the reaction vessel size, essentially because of the limited solubility of chloric acid in sulphuric acid solutions containing sulphate ions.

In a typical case, where chlorine dioxide is manufactured by the sulphur dioxide reduction process, the following simplified equations should be noted:

$$6NaClO_3 + 4H_2SO_4 \rightarrow 6HClO_3 + 2Na_3H(SO_4)_2 \quad (1)$$

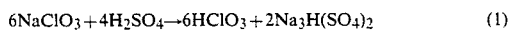

$$6HClO_3 + 3SO_2 \xrightarrow{H_2SO_4} 6ClO_2 + 3H_2SO_4 \quad (2)$$

Overall Reaction

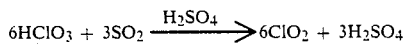

$$6NaClO_3 + H_2SO_4 + 3SO_2 \xrightarrow{H_2SO_4} 6ClO_2 + 2Na_3H(SO_4)_2 \quad (3)$$

In the case of the above sulphur reduction process, the overall reaction may be represented as:

$$6NaClO_3 + 3H_2SO_4 + S \rightarrow 6ClO_2 + 2Na_3H(SO_4)_2 + 2H_2O \quad (4)$$

The limiting factor for production of chlorine dioxide gas is the speed at which the reducing agent reacts with the chloric acid to produce chlorine dioxide. The chloric acid being reduced to chlorine dioxide will create space within the solution for more chloric acid to be formed via reaction 1. If reaction 2 could be accelerated, then it would follow that reaction 1 would produce the requisite chloric acid at a faster rate.

The same is also true for whatever process is used as may be exemplified by the following equations.

Methanol Reduction

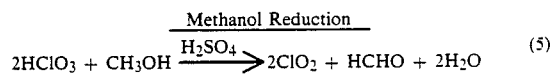

$$2HClO_3 + CH_3OH \xrightarrow{H_2SO_4} 2ClO_2 + HCHO + 2H_2O \quad (5)$$

Chloride Reduction

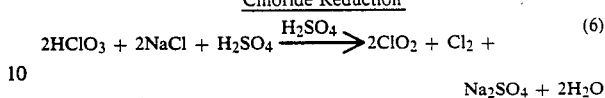

$$2HClO_3 + 2NaCl + H_2SO_4 \xrightarrow{H_2SO_4} 2ClO_2 + Cl_2 + Na_2SO_4 + 2H_2O \quad (6)$$

By accelerating production of chlorine dioxide in equations 5 and 6, chloric acid will be formed at a faster rate in equation 1.

It can therefore be seen that the reaction kinetics in equation 1 are dependent upon the rate of reduction of chloric acid in equations 2, 5 and 6.

It is known from Supplement 2, Part 1 of Mellor's Comprehensive Treatise on Inorganic and Theoretical Chemistry that acetic anhydride acts to liberate chlorine dioxide from sodium chlorite solutions at pH 4 and at room temperature. The release of chlorine dioxide from the sodium chlorite is increased thirty fold with as little as a 0.005 molar acetic anhydride addition.

SUMMARY OF THE INVENTION

The present invention seeks to provide a process of production of chlorine dioxide in which the rate of chlorine dioxide production is increased.

Accordingly the present invention is in a process for producing chlorine dioxide by a reducing a chlorate in sulphuric acid of at least 4N with a reducing agent and is the improvement comprising introducing into the process an oxygen containing organic compound.

In a preferred embodiment of the oxygen containing organic compound may be selected from ethanol, methanol, acetic acid, maleic acid, thioacetic acid and ethyl acetate. However, in a particularly preferred embodiment the oxygen containing organic compound is acetic anhydride.

DESCRIPTION OF THE PREFERRED EMBODIMENTS

Experiments were conducted to examine the catalytic effects of organic oxygen containing compounds in the production of chlorine dioxide by reduction of a chlorate.

BRIEF DESCRIPTION OF THE DRAWINGS

The experiment apparatus and results are shown in the accompanying drawings, in which:

FIG. 1 shows an apparatus comprising a chlorine dioxide reactor 10 having an inlet 12 for dilution air. The inlet 12 has a branch pipe 14 to receive catalyst and reducing agent. The reactor 10 is equipped with a sealable top 16 and with a stirrer shaft 18. The stirrer shaft 18 can be rotated magnetically by a stirring motor 20 in a conventional manner. The reactor 10 is provided with a jacket 22 having an inlet 24 and an outlet 26. A temperature control medium, usually water, is passed through the jacket 22 and a heat exchanger 28 so that the reaction temperature can be controlled.

Gas produced in the chlorine dioxide reactor 10 can the reactor. Reactor temperature was maintained by circulating water at 60° C. through the jacket 22.

Figure 2:
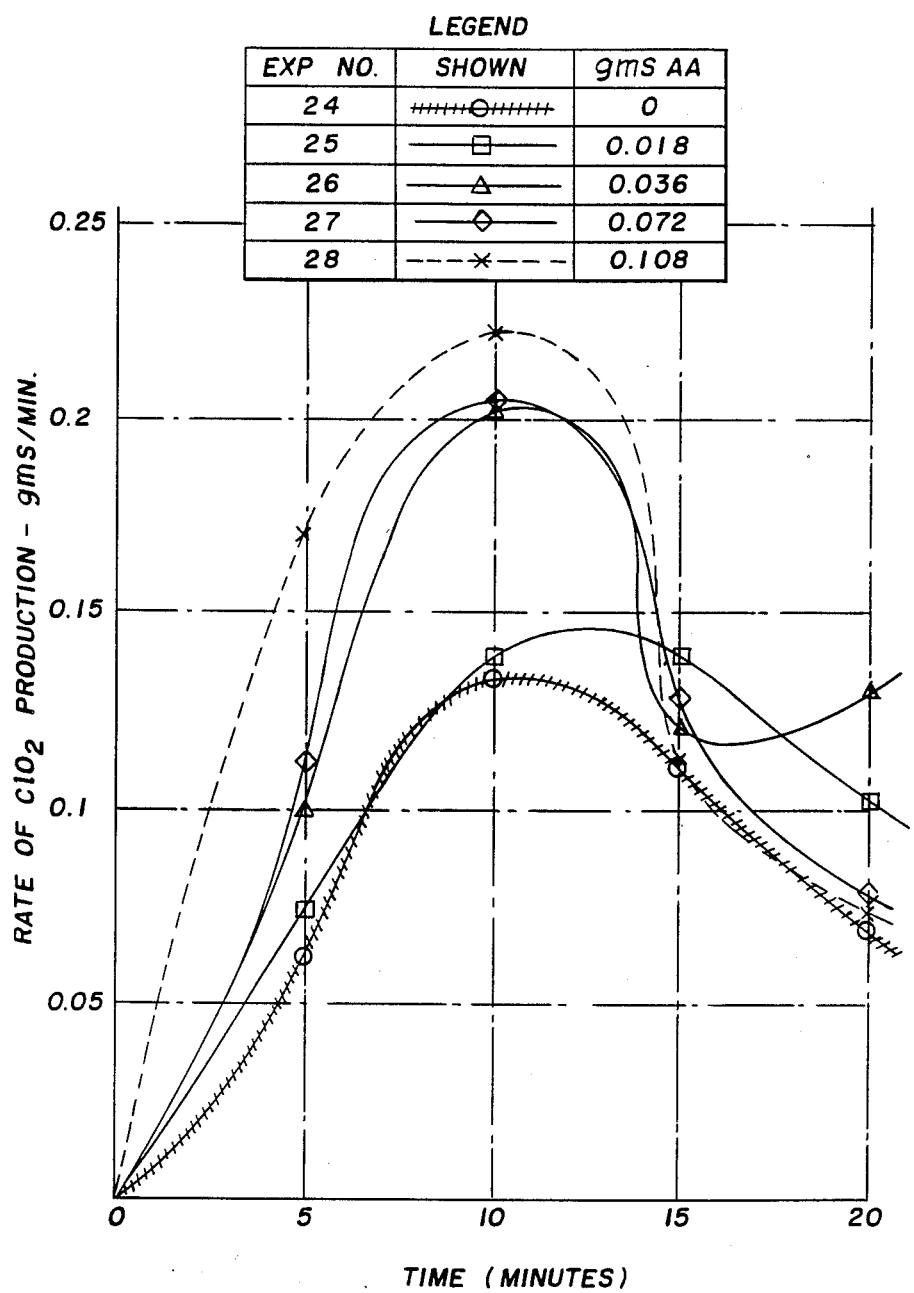
FIG. 2 is a graph relating the rate of chlorine dioxide production to time.

FIG. 2 shows the rate of $ClO_2$ production per unit time with a peak being developed at the 10 minute mark. Table 1 tables the results.

TABLE 1

TABULATED RESULTS

| EXP. NO. 24 | | | EXP. NO. 25 | | | EXP. NO. 26 | | | EXP. NO. 27 | | | EXP. NO. 20 | | | ELAPSED TIME IN MINUTES |
|---|---|---|---|---|---|---|---|---|---|---|---|---|---|---|---|
| ClO2 gms | Cl2 gms | ClO2 gms/min | ClO2 gms | Cl2 gms | ClO2 gms/min | ClO2 gms | Cl2 gms | ClO2 gms/min | ClO2 gms | Cl2 gms | ClO2 gms/min | ClO2 gms | Cl2 gas | ClO2 gas/min | |
| CUMULATIVE | | | CUMULATIVE | | | CUMULATIVE | | | CUMULATIVE | | | CUMULATIVE | | | 0 |
| 0.31 | 0.038 | 0.62 | 0.37 | 0.002 | 0.074 | 0.5 | 0.013 | 0.1 | 0.6 | 0 | 0.12 | 0.72 | 0.047 | 0.144 | 5 |
| 0.98 | 0.042 | 0.134 | 1.06 | 0.002 | 0.138 | 1.51 | 0.013 | 0.202 | 1.62 | 0 | 0.204 | 1.82 | 0.047 | 0.22 | 10 |
| 1.53 | 0.049 | 0.11 | 1.75 | 0.002 | 0.138 | 2.11 | 0.015 | 0.12 | 2.26 | 0 | 0.128 | 2.42 | 0.056 | 0.12 | 15 |
| 1.875 | 0.107 | 0.069 | 2.26 | 0.002 | 0.102 | 2.76 | 0.084 | 0.13 | 2.65 | 0.106 | 0.078 | 2.79 | 0.063 | 0.074 | 20 |
| 0 gms AA | | | 0.018 gms AA | | | 0.036 gms AA | | | 0.072 gms AA | | | 0.108 gms AA | | | |

| | | | | | | EXP. NO. 32 | | | EXP. NO. 34 | | | ELAPSED TIME IN MINUTES |
|---|---|---|---|---|---|---|---|---|---|---|---|---|
| | | | | | | ClO2 gms | Cl2 gms | ClO2 gms/min | ClO2 gms | Cl2 gms | ClO2 gms/min | |
| | | | | | | CUMULATIVE | | | CUMULATIVE | | | 0 |
| | | | | | | 0.67 | 0.022 | 0.134 | 0.57 | 0.13 | 0.114 | 5 |
| | | | | | | 1.66 | 0.042 | 0.198 | 1.61 | 0.13 | 0.208 | 10 |
| | | | | | | 2.32 | 0.058 | 0.132 | 2.34 | 0.13 | 0.146 | 15 |
| | | | | | | 2.67 | 0.21 | 0.07 | 2.74 | 0.10 | 0.080 | 20 |
| | | | | | | 0.049 gas AA | | | 0.08 gas AA | | | |

NOTE
All experiments were conducted over a period of 20 minutes with reactor contents at 60° C. and containing:
$NaClO_3$ - 5 grams
NaCl - 0.25 grams
$H_2SO_4$ - 50 grams
$H_2O$ - 85 mils
Sulphur Sol 0.8 cc
AA - Acetic Anhydride be drawn by a water operated eductor 30 through a first absorber 32 or a second absorber 34. Flow control through the absorbers 32 and 34 is by inlet valves 36 and outlet valves 38. The absorbers 32 and 34 are filled with a 10% potassium iodide solution to absorb chlorine dioxide.

Figure 1:
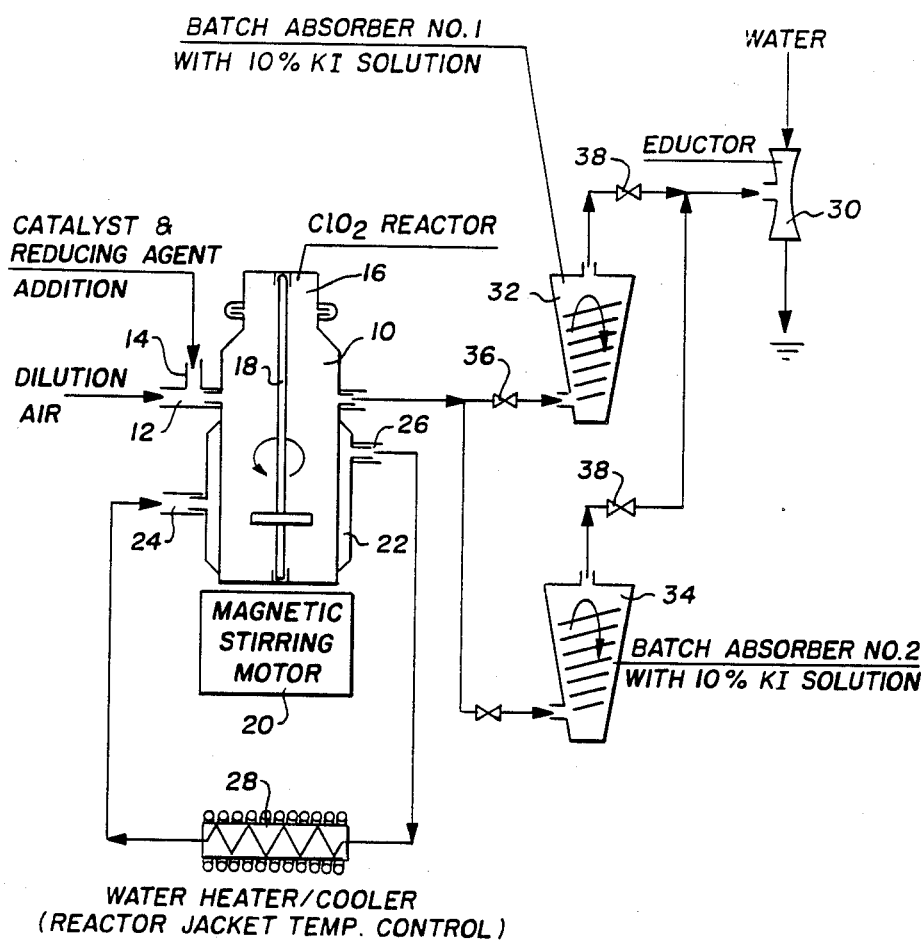
FIG. 1 is a schematic view of the apparatus in which the experiments were conducted.

Using the apparatus illustrated in FIG. 1 the following experiments were conducted. The reactants were introduced into the batch reactor 10 which contained sodium chloride in a 9N sulphuric acid solution. A suitable reducing agent, for example methanol or sulphur, was present and the rate of reaction was observed using as a catalyst certain oxygen containing organic compounds.

EXAMPLE 1

A batch of 9N $H_2SO_4$ solution was prepared, then split into 5 110 milliliter samples. Into each sample 5 grams of $NaClO_3$ were added and each sample set aside.

Sample 1 was then heated to 60° C. in reactor 10 stirred with magnetic stirrer 18. At time zero (0), 0.8 cc of aqueous sulphur solution (70% w/w) was added, while outside air was drawn across the top of the reacting solution to sweep the $ClO_2$ from the reactor into two KI traps 32 and 34 mounted in parallel.

The valves 36 and 38 of traps 32 and 34 were arranged so that after a 5 minute time interval the non-use trap would be alternated into the product stream. Sample 1 was a blank run with no acetic anhydride (AA) in the reactor. Reactor temperature was maintained by circulating water at 60° C. through the jacket 22.

EXAMPLE 2

In this second and subsequent runs using the prepared acid solution, AA was added through a controlled glass dropper into the aqueous solution containing sulphuric acid and sodium chlorate. Within 5 seconds of the AA addition, the sulphur sol reducing agent was added and the stop watch was started.

Figure 3:
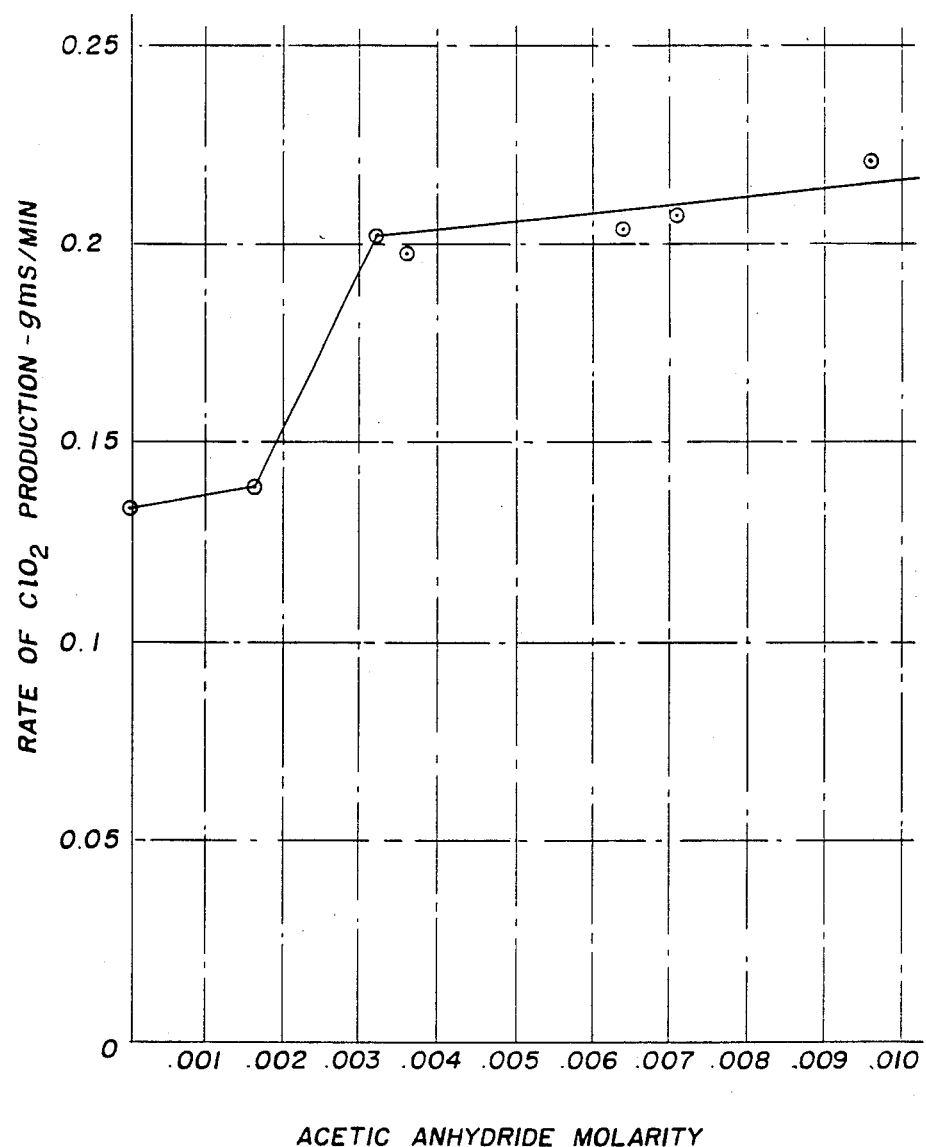
FIG. 3 is a graph relating the rate of chlorine dioxide production to the molarity of acetic anhydride used as a catalyst.

FIG. 3 plots the results of these experiments, and shows that the reaction rate with no AA addition peaks at 0.134 gms of $ClO_2$ per minute. As the AA molarity is increased, the rate of $ClO_2$ production per unit time is increased accordingly, up to 0.22 gms per minute at an AA molarity of 0.0096.

EXAMPLE 3

Figure 4:
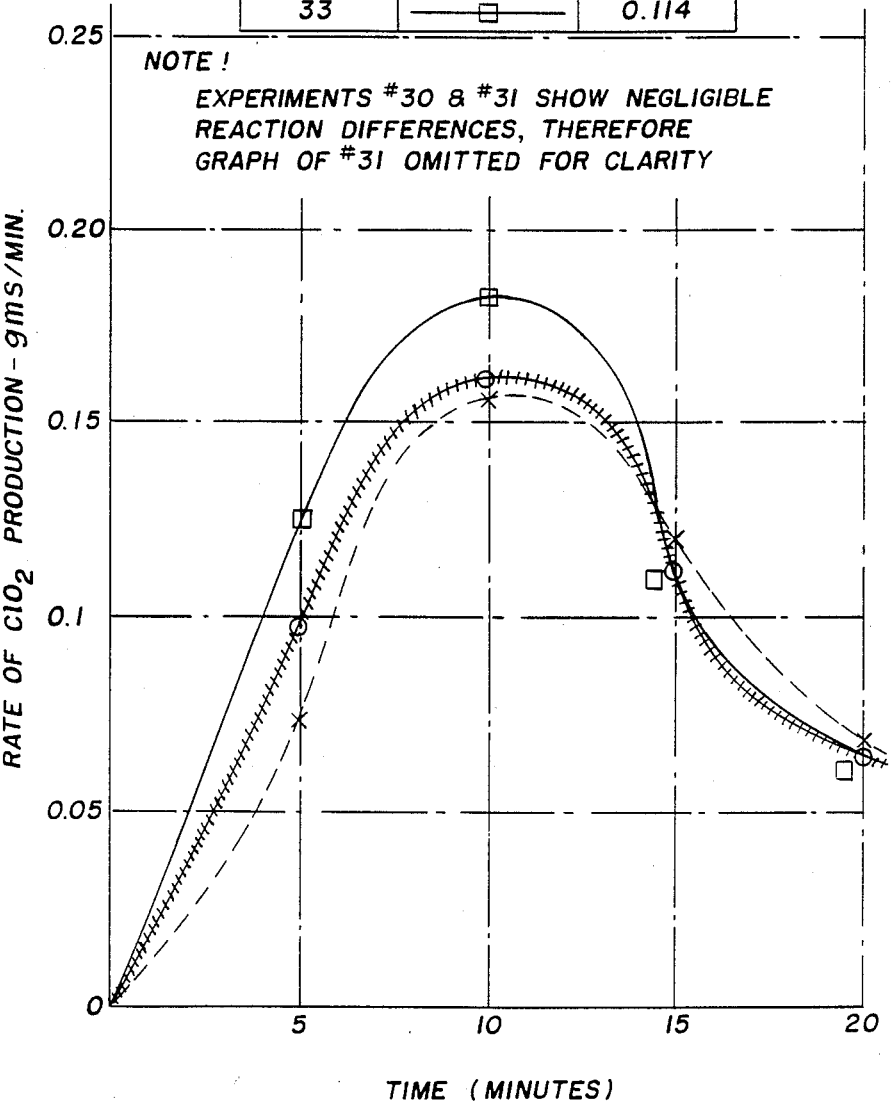
FIG. 4 again relates the rate of chlorine dioxide production to time.

Once again a 9N $H_2SO_4/H_2O$ solution was prepared as in the previous experiments listed as #24 to #28 inclusive and experiments #32 and #34. The preparation, volume, and operating temperature remained the same except for the catalyst, where ethyl alcohol was used. Experiments #29, 30, 31 and 33 are set out in Table 2. An improvement in Production rate did not become obvious until Exp. #23 where 0.114 gms of ethanol was used, or equivalent to 0.018 Molar. This is shown in FIG. 4. Because experiments 30 and 31 show negligible differences the curve for Experiment 31 was omitted.

TABLE 2

TABULATED RESULTS

| EXP. NO. 29 | | | EXP. NO. 30 | | | EXP. NO. 31 | | | EXP. NO. 33 | | | ELAPSED TIME IN MINUTES |
|---|---|---|---|---|---|---|---|---|---|---|---|---|
| ClO2 gms | Cl2 gms | ClO2 gms/min | ClO2 gms | Cl2 gms | ClO2 gms/min | ClO2 gms | Cl2 gms | ClO2 gms/min | ClO2 gms | Cl2 gms | ClO2 gms/min | |
| CUMULATIVE | | | CUMULATIVE | | | CUMULATIVE | | | CUMULATIVE | | | 0 |

TABLE 2-continued

TABULATED RESULTS

| EXP. NO. 29 | | | EXP. NO. 30 | | | EXP. NO. 31 | | | EXP. NO. 33 | | | ELAPSED |
|---|---|---|---|---|---|---|---|---|---|---|---|---|
| ClO2 gms | Cl2 gms | ClO2 gms/min | ClO2 gms | Cl2 gms | ClO2 gms/min | ClO2 gms | Cl2 gms | ClO2 gms/min | ClO2 gms | Cl2 gms | ClO2 gms/min | TIME IN MINUTES |
| 0.49 | 0.042 | 0.098 | 0.37 | 0.078 | 0.074 | 0.39 | 0.066 | 0.078 | 0.62 | 0.12 | 0.124 | 5 |
| 1.29 | 0.142 | 0.16 | 1.15 | 0.123 | 0.156 | 1.19 | 0.108 | 0.16 | 1.53 | 0.18 | 0.182 | 10 |
| 1.85 | 0.19 | 0.112 | 1.75 | 0.132 | 0.12 | 1.77 | 0.13 | 0.116 | 2.09 | 0.22 | 0.112 | 15 |
| 2.16 | 0.3 | 0.062 | 2.09 | 0.132 | 0.068 | 2.12 | 0.20 | 0.07 | 2.41 | 0.25 | 0.064 | 20 |
| 0 gms EtOH | | | 0.019 gms EtOH | | | 0.038 gms EtOH | | | 0.114 gms EtOH | | | |

NOTE
All experiments were conducted over a period of 20 minutes with reactor contents at 60° C. and containing:
$NaClO_3$ - 5 grams
NaCl - 0.25 grams
$H_2SO_4$ - 50 grams
$H_2O$ - 85 mils
Sulphur Sol - 0.8 cc's
EtOH - Ethyl Alcohol In addition to the above specific Examples various combinations of reducing agents and potential catalysts were tried. The following exemplifying the compounds used:

| Reducing Agent | Catalyst |
|---|---|
| Sulphur Solution | Ethanol |
| Sulphur Solution | Methanol |
| Sulphur Solution | Acetic Acid |
| Sulphur Solution | Acetic Anhydride |
| Sulphur Solution | Maleic Acid |
| Sulphur Solution | Thiocetic Acid |
| Sulphur Solution | Ethyl Acetate |
| Methanol | Ethanol |
| Methanol | Acetic Anhydride |

All of the foregoing were tested with varying levels of success. It is correct to say that all catalysts demonstrated an increase in the kinetic reaction between oxidizing and reducing agent to produce chlorine dioxide gas. The effect on the catalyst is presently unknown as the reactor running times are of limited batch duration and the method of analysis complex. It may be postulated however, that the catalysts tested would eventually oxidize, until the affect of speeding up the chlorine dioxide production dropped to normal rates.

The above experimental work indicates that reaction rates are greatly increased using the process of the present invention.

The method of adding the catalyst may vary. In general, a system that will distribute the catalysts throughout the reactor solution quickly is preferred. This rapid mixing may be accomplished by pre-mixing the catalyst with the incoming sodium chlorate solution. If solid, crystal chlorate is added directly to the reactor, the hydrocarbon catalyst may be added to a circulating solution pump.

The embodiments of the invention in which an exclusive property or privilege is claimed are defined as follows:

1. In a process for producing chlorine dioxide by reducing a chlorate in sulphuric acid of at least 4N with a reducing agent the improvement comprising introducing into the process acetic anhydride.

2. A process as claimed in claim 1 in which the reducing agent is selected from the group consisting of sulphur dioxide, methanol and sodium chloride.

3. A process as claimed in claim 1 in which the reducing agent is a solution of sulphur.

4. A process as claimed in claim 1 in which the acetic anhydride molarity is in the range 0.001 to about 0.1.

* * * * *